(12) United States Patent
Maloney et al.

(10) Patent No.: US 8,749,559 B2
(45) Date of Patent: Jun. 10, 2014

(54) MESH SEQUENCE FILE FORMAT

(75) Inventors: Christopher Maloney, San Francisco, CA (US); Ryan Charles Hill, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 13/152,285

(22) Filed: Jun. 3, 2011

(65) Prior Publication Data
US 2012/0306851 A1    Dec. 6, 2012

(51) Int. Cl.
G06T 13/00    (2011.01)
G06F 3/00    (2006.01)

(52) U.S. Cl.
USPC .......................................... 345/473; 715/732

(58) Field of Classification Search
None
See application file for complete search history.

(56) References Cited

U.S. PATENT DOCUMENTS

| | | | |
|---|---|---|---|
| 6,072,496 A | 6/2000 | Guenter et al. | |
| 6,396,500 B1 | 5/2002 | Qureshi et al. | |
| 6,426,747 B1 | 7/2002 | Hoppe et al. | |
| 6,529,192 B1 | 3/2003 | Waupotitsch | |
| 6,982,715 B2 | 1/2006 | Isenburg | |
| 7,342,580 B1 * | 3/2008 | Peterson | 345/418 |
| 7,538,769 B2 | 5/2009 | Hoppe | |
| 7,880,738 B2 * | 2/2011 | Abagyan et al. | 345/420 |
| 2009/0172549 A1 | 7/2009 | Davidson | |
| 2009/0202160 A1 | 8/2009 | Kim et al. | |
| 2010/0037140 A1 | 2/2010 | Penner et al. | |
| 2010/0077298 A1 * | 3/2010 | Schreiber et al. | 715/249 |
| 2010/0162092 A1 * | 6/2010 | Albu et al. | 715/202 |
| 2010/0223554 A1 | 9/2010 | Tilton | |

OTHER PUBLICATIONS

"International Search Report", Mailed Date: Dec. 3, 2012, Application No. PCT/US2012/039939, Filed Date: May 30, 2012, pp. 9, (MS# 332346.02).
Wang, et al., "A Compact Representation for 3D Animation Using Octrees and Affine Transformations", Retrieved at <<http://www.hindawi.com/journals/ijdmb/2010/924091/>>, Hindawi Publishing Corporation International Journal of Digital Multimedia Broadcasting, 2010, pp. 11.
D., Panther., "Unreal File Format", Retrieved at <<http://paulbourke.net/dataformats/unreal/>>, Retrieved Date: Mar. 1, 2011, pp. 3.
"IMOD Binary File Format. Version 1, Revision 2", Retrieved at <<http://bio3d.colorado.edu/imod/doc/binspec.html>>, Retrieved Date :Mar. 1, 2011, pp. 9.

* cited by examiner

*Primary Examiner* — Carlos Perromat
(74) *Attorney, Agent, or Firm* — Jim Ross; Micky Minhas (57) ABSTRACT

Technologies are described herein for generating a binary transition file. Multiple animation structures may be generated in the binary transition file. The animation structures may define a sequence of three-dimensional meshes. A header portion may also be generated in the binary transition file. The header portion may define slides that are applied to the three-dimensional meshes to produce a transition between the slides. A presentation program application may be modified with the binary transition file, thereby adapting the presentation program application to provide the transition.

20 Claims, 4 Drawing Sheets

TABLE 200

| IDENTIFIER 202 | DATA TYPE 204 |
|---|---|
| ANIMATION COUNT 210 | INTEGER |
| ANIMATIONS ARRAY 212 | ARRAY |
| SLIDE IDENTIFIER 216 | INTEGER |
| FLAGS VALUE 218 | INTEGER |
| AMBIENT LIGHTING VALUE 220 | FLOAT |
| FRAME COUNT 222 | INTEGER |
| INDEX COUNT 224 | INTEGER |
| INDEX ARRAY 226 | ARRAY |
| VERTEX COUNT 228 | INTEGER |
| VERTEX DATA ARRAY 230 | ARRAY |
| X-AXIS VALUE 234 | INTEGER |
| Y-AXIS VALUE 236 | INTEGER |
| DELTA STRUCTURE ARRAY 238 | ARRAY |
| MINIMUM VALUE 242 | FLOAT |
| RANGE VALUE 244 | FLOAT |
| DELTADATA STRUCTURE ARRAY 246 | ARRAY |
| DELTADATA DATA STRUCTURE 248 | INTEGER |

Fig. 1

TABLE 200

| IDENTIFIER 202 | DATA TYPE 204 |
|---|---|
| ANIMATION COUNT 210 | INTEGER |
| ANIMATIONS ARRAY 212 | ARRAY |
| SLIDE IDENTIFIER 216 | INTEGER |
| FLAGS VALUE 218 | INTEGER |
| AMBIENT LIGHTING VALUE 220 | FLOAT |
| FRAME COUNT 222 | INTEGER |
| INDEX COUNT 224 | INTEGER |
| INDEX ARRAY 226 | ARRAY |
| VERTEX COUNT 228 | INTEGER |
| VERTEX DATA ARRAY 230 | ARRAY |
| X-AXIS VALUE 234 | INTEGER |
| Y-AXIS VALUE 236 | INTEGER |
| DELTA STRUCTURE ARRAY 238 | ARRAY |
| MINIMUM VALUE 242 | FLOAT |
| RANGE VALUE 244 | FLOAT |
| DELTADATA STRUCTURE ARRAY 246 | ARRAY |
| DELTADATA DATA STRUCTURE 248 | INTEGER |

MESH SEQUENCE FILE FORMAT

BACKGROUND

Generally, electronic presentation program applications allow users to create high-impact dynamic slide presentations that include text, images, sound, video, and/or other types of multimedia. Some presentation program applications may provide, among other features, transitions between slides within a presentation. Slide transitions may refer to animation-like effects that occur when a user moves from one slide to the next slide while giving the presentation. A user may include slide transitions within the presentation in order to add visual flair to the presentation.

Presentation program applications may include functionality enabling a user to select a predefined transition from multiple available transitions to include in a presentation. In a conventional reverse engineering workflow for creating a predefined transition, a designer may brainstorm a transition concept and then create a visual representation (e.g., a video) of the transition concept. Using the visual representation as a reference, a programmer may create a set of mathematical expressions that represent the movements of the slide in the transition concept. Upon creating the set of mathematical expressions, the programmer may translate the set of mathematical expressions into program code that can be incorporated into a presentation program application. Testers may test the presentation program application and determine whether the executed transition corresponding to the program code is satisfactory. If the executed transition is not satisfactory, then the programmers may need to recreate the mathematical expression and retranslate the program code.

The conventional reverse engineering workflow has proven over time to be time-consuming and burdensome. The programmers may need multiple iterations of creating multiple sets of mathematical expressions and translating each set into program code before the testers determine that the executed transition is satisfactory. Each program code corresponding to a new set of mathematical expressions may require extensive testing. Further, some transitions involving intricate movements may not be conveniently expressed by mathematical expressions.

It is with respect to these considerations and others that the disclosure made herein is presented.

SUMMARY

Technologies are described herein generating a binary transition file. The binary transition file may define a sequence of three-dimensional meshes representing a transition. A three-dimensional mesh may include, among other information, a collection of vertices defining some three-dimensional geometry and a collection of indices defining faces of the three-dimensional geometry. The size of the transition file can be significantly reduced based on various assumptions that can be made about slide transitions.

In some example technologies, a method is configured to generate the binary transition file. According to the method, technologies may generate multiple animation structures in the binary transition file. The animation structures may define a sequence of three-dimensional meshes. The technologies may also generate a header portion in the binary transition file. The header portion may define slides that are applied to the three-dimensional meshes to produce a transition between the slides. The technologies may further modify a presentation program application with the binary transition file. The presentation program application may be adapted to provide the transition upon modification via the binary transition file.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for translating a design of a transition into a binary transition file that can be utilized to implement the transition in a presentation program application. Through the utilization of the technologies and concepts presented herein, the binary transition file can be generated without having to reverse engineer the design into a set of mathematical expressions. As a result, development costs for developing a new transition are significantly decreased. Further, certain transitions that were not possible or too challenging to implement as mathematical expressions can now be developed.

The binary transition file may define a sequence of three-dimensional meshes representing a transition. A three-dimensional mesh may include a collection of vertices defining some three-dimensional geometry and a collection of indices defining faces of the three-dimensional geometry. A transition (i.e., an animation) may be produced when the three-dimensional meshes are shown in the sequence. A presentation may include multiple slides. One or more slides in the presentation may be applied as a texture to each of the three-dimensional meshes in the sequence. That is, locations in a slide may be mapped to corresponding locations in a three-dimensional mesh. In this way, the slides can be animated according to the sequence of three-dimensional meshes during execution of the transition.

Generally, files defining a three-dimensional animation are relatively large. Such files can be impractical when incorporated into presentation files that users typically expect to be smaller. For example, users may expect that presentation files are small enough to be easily transferred by email, which can have file size transfer limits, and/or stored on a portable flash memory data storage device having limited storage capacity. To this end, the size of the transition file can be significantly reduced based on various assumptions that can be made about slide transitions. The binary transition file can be further compressed utilizing suitable data compression technologies.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
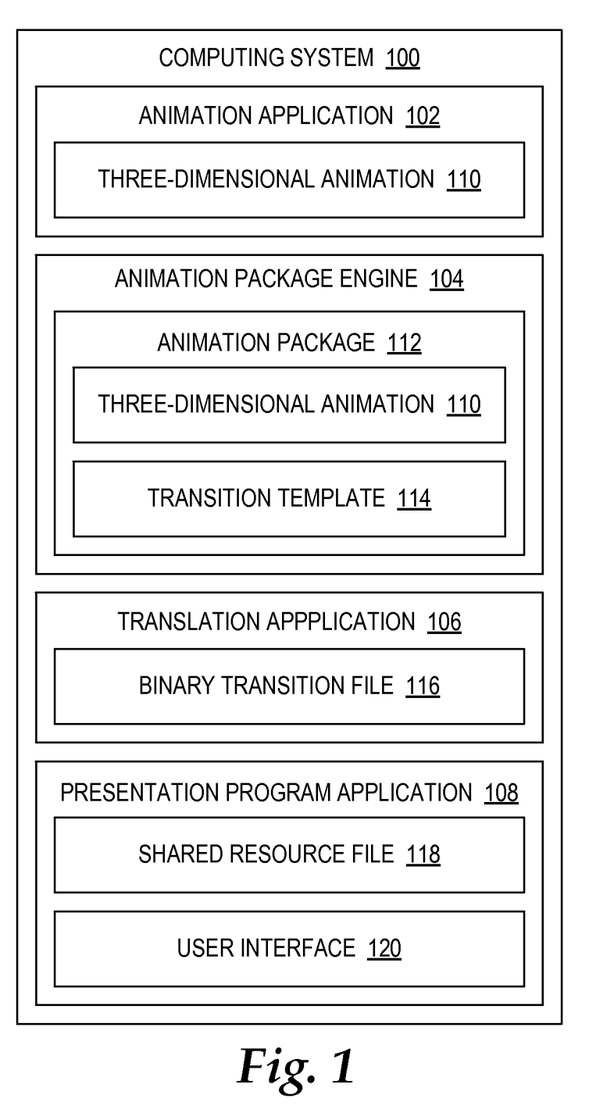
FIG. 1 is a block diagram illustrating a block diagram illustrating a computing system adapted to generate a binary transition file, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for translating a design of a transition into a transition file that is readable by a presentation program application to implement the transition. FIG. 1 is a block diagram illustrating a computing system 100 adapted to generate a binary transition file, in accordance with some embodiments. The computing system 100 may include an animation application 102, an animation package engine 104, a translation application 106, and a presentation program application 108.

A transition designer may utilize the animation application 102 to create a three-dimensional animation 110 representing a given transition. In various embodiments, the animation application 102 may be any suitable three-dimensional computer graphics animation program. The three-dimensional animation 110 may be embodied in one or more files. In some embodiments, the three-dimensional animation 110 may be embodied in an OBJ geometry definition file format from WAVEFRONT TECHNOLOGIES. For example, each frame in the three-dimensional animation 110 may be represented by a corresponding OBJ file. In other embodiments, the three-dimensional animation 110 may be embodied in any suitable three-dimensional model format.

Upon creating the three-dimensional animation 110, the transition designer may utilize the animation package engine 104 to export the three-dimensional animation 110 into an animation package 112. The animation package 112 may include the three-dimensional animation 110 (e.g., OBJ files) and a transition template 114. The transition template 114 may include information defining an initial state and an end state of the transition. Generally, slides in a presentation occupy the same geometric space. As a result, the initial state and the end state may be identical, unlike many other animations.

The transition template 114 may also include information defining a slide. For example, the slide may be represented as a single polygonal plane. The transition template 114 may further include information about a coordinate system (e.g., a right-handed coordinate system) associated with the slide. The transition template 114 may further include a slide position (e.g., the center of the slide may be positioned at the origin (0, 0, 0) of the coordinate system).

The transition template 114 may further include a slide rotation (e.g., the slide may be rotated 90 degrees around the x-axis, thereby placing the slide flat on plane defined by the x-axis and y-axis, with the z-axis pointing outward from the front face of the slide in the positive direction) associated with the slide. The transition template 114 may further include a slide scale (e.g., dimensions of a slide may be configured as a 10"×7.5" slide, which maps to 13.33×10 OBJ units) associated with the slide. The transition template 114 may further include a default slide lighting (e.g., single directional lighting point down the negative z-axis with an intensity of 1.0) when a user of the presentation program application does not define a lighting configuration.

The transition designer may input the animation package 112 into the translation application 106. The translation application 106 may be configured to perform a conversion process with the animation package 112 as a parameter of the conversion process. The conversion process may convert the animation package 112 into a binary transition file 116 based on the three-dimensional animation 110 and the transition template 114. The conversion process may extract transition information from the three-dimensional animation 110. The transition information may include information relevant for implementing the transition in the presentation program application 108. The conversion process may then adapt the transition information according to the transition template 114, thereby generating the binary transition file 116.

The binary transition file 116 may store data in a binary format. In some embodiments, the translation application 106 may also be configured to perform a compression process that compresses the binary transition file 116 via suitable data compress techniques. For example, the translation application 106 may compress the binary transition file 116 into a ZIP file container. An example of a file format of the binary transition file 116 will be described in greater detail with reference to FIG. 2. The file format contains various examples of transition information that can be included in the binary transition file 116.

Upon generating the binary transition file 116, the transition designer may update the presentation program application 108 to include the binary transition file 116. For example, the transition designer may update a dynamic linked library resource file 118 or other shared resource file in the presentation program application 108 to include the new transition. The transition designer may also update a user interface 120 of the presentation program application 108 to include the new transition. In this way, a user can select the new transition from the user interface of the presentation program application 108.

Figure 2:
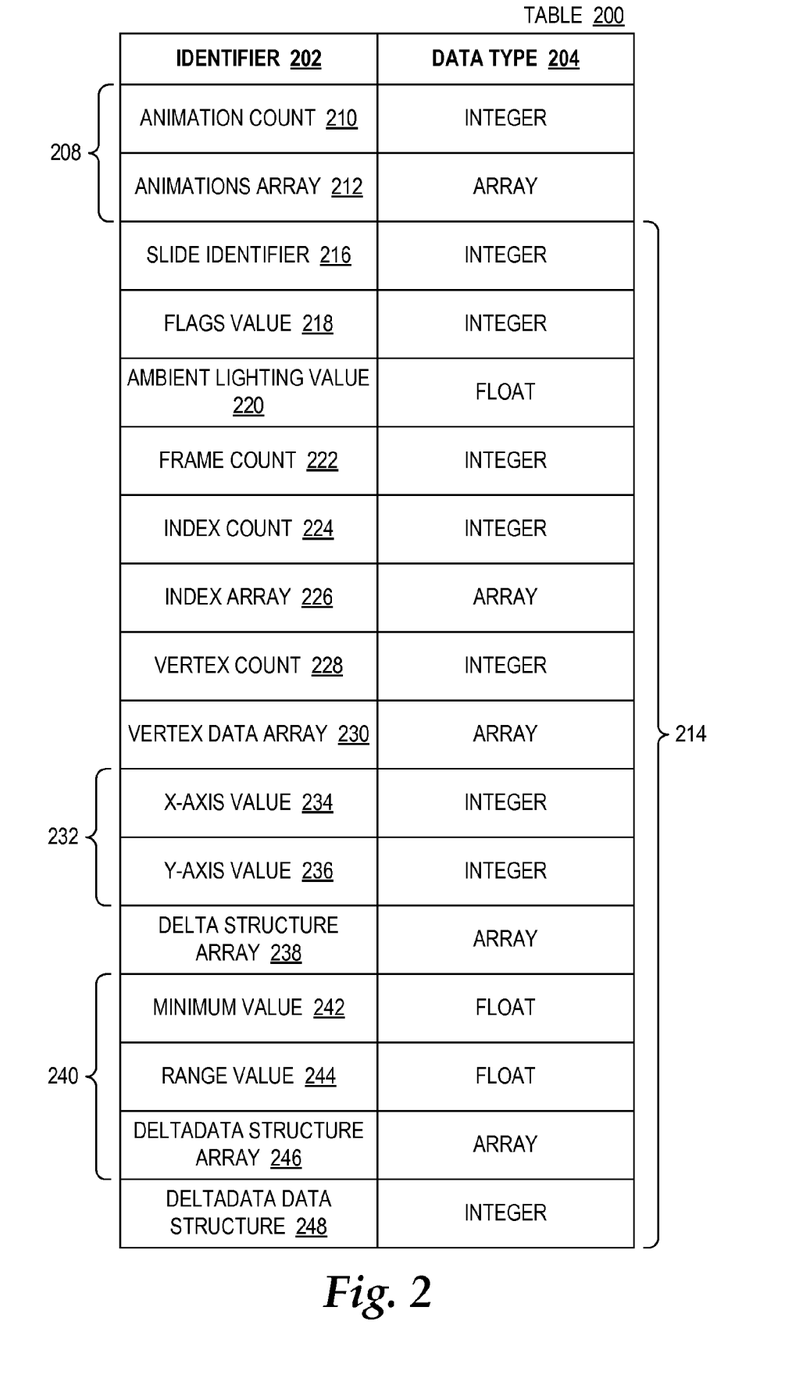
FIG. 2 is a diagram illustrating a table describing example transition information contained in an example data format for the binary transition file, in accordance with some embodiments.

FIG. 2 is a diagram illustrating a table 200 describing example transition information contained in an example data format for the binary transition file 116, in accordance with some embodiments. This transition information in the binary transition file may correspond to a transition. In various implementations, the data format may include a combination of some or all of the information contained in the table 200. The table 200 includes an identifier column 202 and a data type column 204. The identifier column 202 may specify an identifier of an example information type contained in the binary transition file 116. The data type column 204 may specify an example data type of the corresponding information type.

The binary transition file 116 may include header portion 208. The header portion 208 may include an animation count 210. The animation count 210 may be configured as a 32-bit unsigned integer that stores a number (i.e., a quantity) of objects, such as slides, in the transition. For example, the animation count 210 may store a number of slides utilized in the transition corresponding to the binary transition file 116. A typical transition may involve two slides (i.e., a previous slide and a next slide). In this case, the animation count 210 may store a value of two. Other transitions may utilize more than two slides.

The header portion 208 may further include an animations array 212. The animations array 212 may be configured as an array having multiple animation data structures. The number of animation data structures in the array may correspond to the animation count 210. Each animation data structure may store animation data regarding a different slide of a presentation that will be utilized in the transition. The animation data may include suitable image data (e.g., the location and content of various text, shapes, colors, etc.) enabling the presentation program application 108 to render each slide.

For example, if the animation count 210 is two, then the animations array 212 may include two animation data structures. The first animation data structure in the animations array 212 may store animation data corresponding to the first slide, and the second animation data structure in the animations array 212 may store animation data corresponding to the second slide. The animations array 212 may be configured to store the animation data structures in sequential order corresponding to the order of the slides (e.g., animations[0] may correspond to the first slide of a sequence, animations[1] may correspond to the second slide of the sequence, and so forth).

The binary transition file 116 may further include multiple instances of an animation structure 214. Each instance of the animation structure 214 may correspond to a three-dimensional mesh in the transition. For example, if the transition includes three three-dimensional meshes, then the binary transition file 116 may include three instances of the animation structure 214. The animation structure 214 may include a slide identifier 216, a flags value 218, an ambient lighting value 220, a frame count 222, an index count 224, an index array 226, a vertex count 228, a vertex data array 230, a vertex data structure 232 including an x-axis value 234 and a y-axis value 236, a delta structure array 238, a delta data structure 240 including a minimum value 242, a range value 244, a deltadata structure array 246, and/or and a deltadata data structure 248.

The slide identifier 216 may be configured as a 32-bit unsigned integer (e.g., DWORD) that specifies an identifier of a slide that is applied to the corresponding three-dimensional mesh. As previously described, the animation data for rendering the slide may be stored in the animations array 212. The slides may be identified according to sequential identifiers corresponding to the order of the slides in the presentation. For example, the first slide may have an identifier of zero, the second slide may be an identifier of one, the third slide may have an identifier of two, and so forth.

The flags value 218 may be configured as a 32-bit unsigned integer that specifies a series of on/off flags that can be utilized to provide additional information about the corresponding three-dimensional mesh and/or the transition. Each bit in the 32-bit unsigned integer may correspond to a different flag having a zero value or a one value. An example flag may specify whether the corresponding three-dimensional mesh is rendered as a single-sided three-dimensional mesh or a double-sided three-dimensional mesh. In this example, a zero value may correspond to the single-sided three-dimensional mesh, and the one value may correspond to the double-sided three-dimensional mesh.

The ambient lighting value 220 may be configured as a floating point value that specifies an amount of ambient lighting applied to the corresponding three-dimensional mesh. For example, the ambient lighting value 220 can range from 0.0 and 1.0. The frame count 222 may be configured as a 32-bit unsigned integer that specifies a number of animation frames of the transition in which the corresponding three-dimensional mesh is present. Each three-dimensional mesh in the binary transition file 116 may be present in a different number of animation frames. That is, the transition may utilize the same three-dimensional mesh for one or more animation frames.

The index count 224 may be configured as a 32-bit unsigned integer that specifies a number of indices in the corresponding three-dimensional mesh. The index array 226 may be configured as an array having a number of elements. Each element may be configured as a 16-bit unsigned integer (e.g., WORD) that sequentially stores indices in the corresponding three-dimensional mesh. The number of elements in the index array 226 may correspond to the number of indices specified in the index count 224. In some embodiments, the indices may be stored as 16-bit values in groups of three (e.g., three points define a triangle). For example, if there are four vertices numbered 0 through 4, then the indices could make two triangles out of those four vertices. The first triangle may utilize vertices 0, 1, and 2, and the second triangle may utilize vertices 0, 2, and 3 (with vertices 0 and 2 being shared). The indices may enable the triangles to share vertices.

In some embodiments, only the indices in the three-dimensional mesh of the first animation frame are stored in the index array 226. This is because the indices in the three-dimensional mesh of the first animation frame may remain constant throughout the transition for other three-dimensional meshes of additional animation frames. As a result, the size of the binary transition file 116 can be significantly reduced by not having to store the same information for additional animation structures 214.

The vertex count 228 may be configured as a 32-bit unsigned integer that specifies a number of vertices in the corresponding three-dimensional mesh. The vertex data array 230 may be configured as an array having multiple vertex data structures 232. Each vertex data structure 232 may be configured as a 16-bit unsigned integer per axis that sequentially stores vertices in the corresponding three-dimensional mesh. The vertex data structure 232 may include an x-axis value 234 and a y-axis value 236. The number of vertex data structures 232 in the vertex data array 230 may correspond to the number of vertices specified in the vertex count 228.

In some embodiments, only the vertices in the three-dimensional mesh of the first animation frame are stored in the vertex data structure 232. The number of vertices in the various three-dimensional meshes in the binary transition file 116 may not change during the course of the transition. Changes in positions (also referred to herein as "delta values") of the vertices can be defined by the delta structure array 238, which is described in greater detail below. The changes in positions of the vertices from one animation frame to the next animation frame are generally small. By storing only the changes to the positions, rather than the full coordinate values, of the vertices, the size of the binary transition file 116 can be significantly reduced.

Further, in some embodiments, only the x-axis and y-axis coordinates, and not the z-axis coordinates, of the vertices in the three-dimensional mesh of the first animation frame are stored in the vertex data structure 232. This is because, in the first frame of a transition, the corresponding three-dimensional mesh is typically flat on a plane (i.e., the z-axis value will be zero). By storing only the x-axis and y-axis coordinates, and not the z-axis coordinates, of the vertices in the three-dimensional mesh of the first animation frame, the size of the binary transition file 116 can be significantly reduced.

The delta structure array 238 may be configured as an array having multiple delta data structures 240. The number of delta data structures 240 in the delta structure array 238 may correspond to the frame count 222. Each of the delta data structures 240 may store a minimum value 242, a range value 244, and a deltadata structure array 246. The minimum value 242 may be configured as a 32-bit floating point value (e.g., float) per axis that stores the minimum delta value across the vertices in the corresponding three-dimensional mesh for the corresponding frame. The range value 244 may be configured as a 32-bit floating point value per axis that stores the range of delta values across the vertices in the corresponding three-dimensional mesh for the corresponding frame.

The deltadata structure array 246 may be configured as an array having multiple deltadata data structures 248. The number of deltadata data structures 248 in the deltadata structure array 246 may correspond to the vertex count 228 of the corresponding three-dimensional mesh. That is, each of the deltadata data structures 248 may correspond to one of the vertices in the corresponding three-dimensional mesh. Each of the deltadata data structures 248 may be configured as a 16-bit signed integer. Various portions of the 16-bit signed integer may be allocated to define changes to the x-axis, changes to the y-axis, and changes to the z-axis of the corresponding vertex between the three-dimensional mesh of the current frame and the three-dimensional mesh of the previous frame. For example, the first six bits may define changes to the x-axis, the next five bits may define changes to the y-axis, and the last five bits may define changes to the z-axis.

By storing the delta values for the x-axis, the y-axis, and the z-axis in a single 16-bit signed integer, as opposed to storing three separate values, the size of the binary transition file 116 can be significantly reduced. Further, if the view plane of the animation frames remains relatively constant across the transition (i.e., changes to the z-axis are relatively small), then the bits originally allocated to the z-axis can be reallocated for the x-axis and/or the y-axis. To calculate the position of a vertex of each frame after the first, the following calculation may be used (this example is only the x-axis, but the same calculation may be used for other axes): x'=delta.x*range.x+min.x where the '.x' notation means the x component of each term. The next frame is then generated with deltas relative to the previous frame's calculated position.

The above implementations of the binary transition file 116 do not store the normal for each vertex in each of the three-dimensional meshes across the transition. In some embodiments, the presentation program application 108 may calculate the normals for each vertex "on the fly" with sufficient accuracy that the normals do not need to be calculated ahead of time and stored in the binary transition file 116. This is because the triangle definitions imply a direction and a standard normal calculation is used. By eliminating the storage of the normals for each vertex in each of the three-dimensional meshes across the transition, the size of the binary transition file 116 can be significantly reduced.

Figure 3:
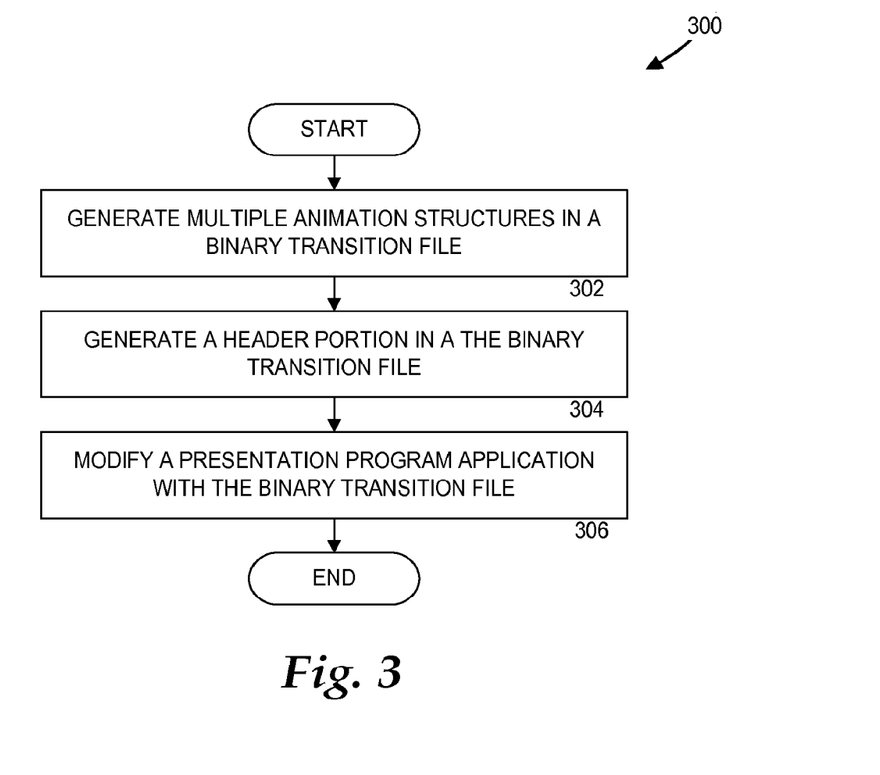
FIG. 3 is a flow diagram illustrating a method for generating the binary transition file, in accordance with some embodiments.

Referring now to FIG. 3, additional details regarding the operation of the translation application 106 will be provided. FIG. 3 is a flow diagram illustrating a method for generating a binary transition file, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 3, a routine 300 begins at operation 302, where the translation application 106 generates multiple animation structures, such as the animation structure 214, in a binary transition file, such as the binary transition file 116. The binary transition file may define a sequence of three-dimensional meshes. For example, the multiple animation structures may include an animation structure that defines a three-dimensional mesh. In some embodiments, the animation structure may include an index count, such as the index count 224, which specifies a quantity of indices in the three-dimensional mesh. The animation structure may also include an index array, such as the index array 226, which includes multiple elements. Each of the elements may store one of the indices.

In some embodiments, the animation structure may include a vertex count, such as the vertex count 228, which specifies a quantity of vertices in the three-dimensional mesh. The animation structure may also include a vertex data array, such as the vertex data array 230, which includes multiple vertex data structures, such as the vertex data structure 232. Each of the vertex data structures may store one of the vertices. For example, each of the vertex data structures may store an x-axis value of a corresponding vertex and a y-axis value of the corresponding vertex. Each of the vertex data structures may not store a z-axis value of the corresponding vertex.

In some embodiments, the animation structure may include a frame count, such as the frame count 222, which specifies a quantity of animation frames of the transition in which three-dimensional mesh is present. The animation structure may also include a delta structure array, such as the delta structure array 238, which includes multiple delta data structures, such as the delta data structure 240. Each of the delta data structures may correspond to one of the animation frames. Each of the delta data structures may store a minimum value, a range value, and a deltadata structure array. The minimum value, such as the minimum value 242, may specify a minimum delta value amount multiple delta values across the vertices. The range value, such as the range value 244, may specify a range of delta values across the vertices.

The deltadata structure array, such as the deltadata structure array 246, may include a plurality of deltadata data structures, such as the deltadata data structure 248. Each of the deltadata data structures may correspond to one of the vertices. Each of the deltadata data structures may store an x-axis delta value, a y-axis delta value, and a z-axis delta value. In some embodiments, the x-axis delta value, the y-axis delta value, and the z-axis delta value may be stored in a single integer.

In some embodiments, the animation structure may include a slide identifier, such as the slide identifier 216, which specifies one of the slides that is applied to the three-dimensional mesh. The animation structure may also include a flags value, such as the flags value 218, which provides additional information regarding the three-dimensional mesh. Each bit of the flags value 218 may represent different flag. For example, the flags value may include a bit that define whether the three-dimensional mesh is rendered as a double-sided three-dimensional mesh or a single-sided three-dimensional mesh. The animation structure may further include an ambient lighting value, such as the ambient lighting value 220, which specifies an amount of ambient lighting applied to the three-dimensional mesh. When the translation application 106 generates the animation structures in the binary transition file, the routine 300 may proceed to operation 304.

At operation 304, the translation application 106 may generate a header portion in the binary transition file. In some embodiments, the header portion may include an animation count, such as the animation count 210, which specifies a quantity of slides in the transition. The header portion may also include an animations array, such as the animations array 212. The animations array 212 may include multiple animation data structures. Each of the animation data structures may specify animation data enabling the presentation program application, such as the presentation program application 108, to render a slide corresponding to the animation data. When the translation application 106 generates the header portion of the binary transition file, the routine 300 may proceed to operation 306.

At operation 306, the translation application 106 may modify the presentation program application to include the binary transition file. For example, the translation application 106 may update a shared resource file, such as the dynamic linked library resource file 118, in the presentation program application to include the new transition. The translation application 106 may also update a user interface, such as the user interface 120, of the presentation program application to include the new transition. When the translation application 106 modifies the presentation program application to include the binary transition file, the routine 300 may either repeat (e.g., periodically, continuously, or on demand as needed) or terminate.

Figure 4:
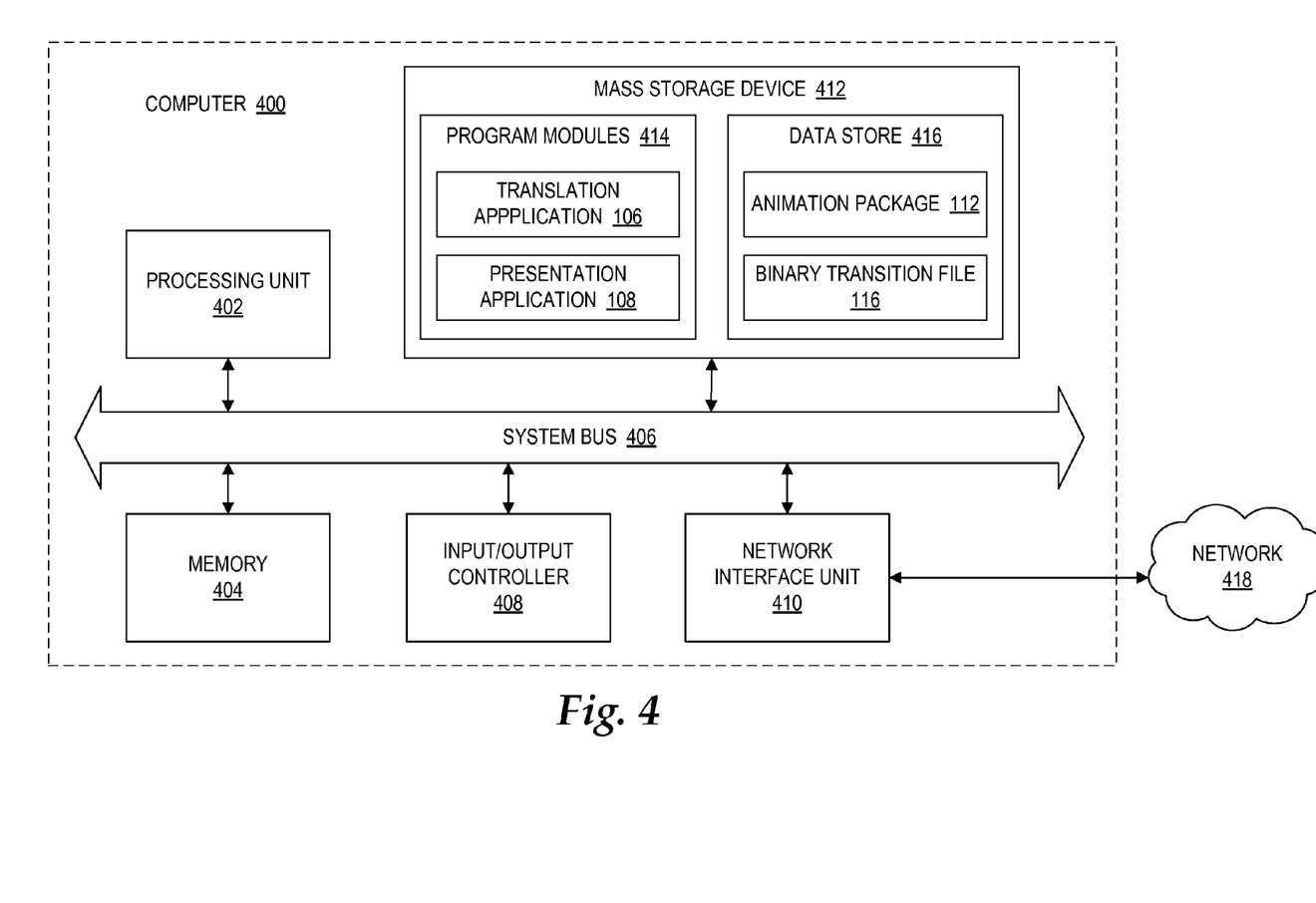
FIG. 4 is a computer architecture diagram showing an illustrative computer hardware architecture for a computing system capable of implementing the embodiments presented herein.

Turning now to FIG. 4, an example computer architecture diagram showing a computer 400 is illustrated. Examples of the computer 400 may include the computing system 100. The computer 400 may include a central processing unit 402, a system memory 404, and a system bus 406 that couples the memory 404 to the central processing unit 402. The computer 400 may further include a mass storage device 412 for storing one or more program modules 414 and a data store 416. Examples of the program modules 414 may include the translation application 106 and the presentation program application 108. The data store 416 may store the animation package 112 and the binary transition file 116. The mass storage device 412 may be connected to the processing unit 402 through a mass storage controller (not shown) connected to the bus 406. The mass storage device 412 and its associated computer-storage media may provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to generate a binary transition file. The program modules 414 may also provide various tools or techniques by which the computer 400 may participate within the overall systems or operating environments using the components, flows, and data structures discussed throughout this description. For example, the program modules 414 may implement interfaces for generating a binary transition file.

In general, the program modules 414 may, when loaded into the processing unit 402 and executed, transform the processing unit 402 and the overall computer 400 from a general-purpose computing system into a special-purpose computing system customized to generate a binary transition file. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for translating a design of a transition into a binary transition file that can be utilized to implement the transition in a presentation program application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for generating a binary transition file, the method comprising computer-implemented operations for:
generating, by a computer having a processor and a memory, a plurality of animation structures in the binary transition file, the plurality of animation structures defining a sequence of three-dimensional meshes;
generating, by the computer, a header portion in the binary transition file, the header portion defining slides that are applied to the three-dimensional meshes to produce a transition between the slides; and
modifying, by the computer, a presentation program application with the binary transition file, the presentation program application adapted to provide the transition upon the modification.

2. The computer-implemented method of claim 1, wherein generating the plurality of animation structures in the binary transition file comprises computer-implemented operations for:
generating, by the computer, a first animation structure in the binary transition file, the first animation structure defining a first three-dimensional mesh in the sequence of three-dimensional meshes.

3. The computer-implemented method of claim 2, wherein generating the first animation structure in the binary transition file comprises computer-implemented operations for:
generating, by the computer, an index count in the first animation structure, the index count specifying a quantity of indices in the first three-dimensional mesh; and
generating, by the computer, an index array in the first animation structure, the index array comprising a plurality of elements, each of the plurality of elements storing one of the indices.

4. The computer-implemented method of claim 3, wherein generating the first animation structure in the binary transition file further comprises computer-implemented operations for:
generating, by the computer, a vertex count in the first animation structure, the vertex count specifying a quantity of vertices in the first three-dimensional mesh; and
generating, by the computer, a vertex data array in the first in the first animation structure, the vertex data array comprising a plurality of vertex data structures, each of the plurality of vertex data structures storing one of the vertices.

5. The computer-implemented method of claim 4, wherein each of the vertex data structures comprises an x-axis value of the one of the vertices and a y-axis value of the one of the vertices.

6. The computer-implemented method of claim 5, wherein generating the first animation structure in the binary transition file further comprises computer-implemented operations for:
generating, by the computer, a frame count in the first animation structure, the frame count specifying a quantity of animation frames of the transition in which the first three-dimensional mesh is present; and
generating, by the computer, a delta structure array in the first animation structure, the delta structure array comprising a plurality of delta data structures, each of the plurality of delta data structures corresponding to one of the animation frames.

7. The computer-implemented method of claim 6, wherein each of the plurality of delta data structures comprises a minimum value specifying a minimum delta value in a plurality of delta values across the vertices in the one of the animation frames, a range value specifying a range of the plurality of delta values across the vertices in the one of the animation frames, and a deltadata structure array.

8. The computer-implemented method of claim 7, wherein the deltadata structure array comprises a plurality of deltadata data structures, each of the plurality of deltadata data structures corresponding to one of the vertices; and wherein each of the plurality of deltadata data structures comprises an x-axis delta value, a y-axis delta value, and a z-axis delta value.

9. The computer-implemented method of claim 8, wherein each of the plurality of deltadata data structures comprises a single integer that stores the x-axis delta value, the y-axis delta value, and the z-axis delta value.

10. The computer-implemented method of claim 9, wherein generating the first animation structure in the binary transition file further comprises computer-implemented operations for:
generating, by the computer, a slide identifier in the first animation structure, the slide identifier specifying one of the slides that is applied to the first three-dimensional mesh;
generating, by the computer, a set of flags in the first animation structure, the set of flags providing additional information regarding the first three-dimensional mesh; and generating, by the computer, an ambient lighting value in the first animation structure, the ambient lighting value specifying an amount of ambient lighting applied to the first three-dimensional mesh.

11. The computer-implemented method of claim 10, wherein the set of flags comprises a first flag, a first bit value of the first flag specifying that the first three-dimensional mesh is rendered as a double-sided three-dimensional mesh, a second bit value of the first flag specifying that the first three-dimensional mesh is rendered as a single-sided three-dimensional mesh.

12. The computer-implemented method of claim 1, wherein generating the header portion in the binary transition file comprises computer-implemented operations for:
generating, by the computer, an animation count in the header portion, the animation count specifying a quantity of slides in the transition; and
generating, by the computer, an animations array in the header portion, the animations array comprising a plurality of animation data structures, each of the plurality of animation data structures specifying animation data enabling the presentation program application to render a slide corresponding to the animation data.

13. An optical disk, a magnetic disk storage device, or a solid state storage device having computer-executable instructions stored thereon which, when executed by a computer, cause the computer to:
generate a plurality of animation structures in a binary transition file, the plurality of animation structures defining a sequence of three-dimensional meshes, the plurality of animation structures specifying vertices and indices forming the three-dimensional meshes;
generate a header portion in the binary transition file, the header portion defining slides that are applied to the three-dimensional meshes to produce a transition between the slides; and
modify a presentation program application with the binary transition file, the presentation program application adapted to provide the transition upon the modification.

14. The optical disk, a magnetic disk storage device, or solid state storage device of claim 13, wherein to generate the plurality of animation structures in the binary transition file, the computer-executable instructions further cause the computer to:
generate a first animation structure in the binary transition file, the first animation structure defining a first three-dimensional mesh in the sequence of three-dimensional meshes.

15. The optical disk, a magnetic disk storage device, or solid state storage device of claim 14, wherein to generate the first animation structure in the binary transition file, the computer-executable instructions further cause the computer to:
generate an index count in the first animation structure, the index count specifying a quantity of indices in the first three-dimensional mesh;
generate an index array in the first animation structure, the index array comprising a plurality of elements, each of the plurality of elements storing one of the indices;
generate a vertex count in the first animation structure, the vertex count specifying a quantity of vertices in the first three-dimensional mesh; and
generate a vertex data array in the first in the first animation structure, the vertex data array comprising a plurality of vertex data structures, each of the plurality of vertex data structures storing one of the vertices.

16. The optical disk, a magnetic disk storage device, or solid state storage device of claim 15, wherein each of the vertex data structures comprises an x-axis value of the one of the vertices and a y-axis value of the one of the vertices, without a z-axis value of the one of the vertices.

17. The optical disk, a magnetic disk storage device, or solid state storage device of claim 16, wherein to generate the first animation structure in the binary transition file, the computer-executable instructions further cause the computer to:
generate a frame count in the first animation structure, the frame count specifying a quantity of animation frames of the transition in which the first three-dimensional mesh is present;
generate a delta structure array in the first animation structure, the delta structure array comprising a plurality of delta data structures, each of the plurality of delta data structures corresponding to one of the animation frames;
wherein each of the plurality of delta data structures comprises a minimum value specifying a minimum delta value in a plurality of delta values across the vertices in the one of the animation frames, a range value specifying a range of the plurality of delta values across the vertices in the one of the animation frames, and a delta-data structure array;
wherein the deltadata structure array comprises a plurality of deltadata data structures, each of the plurality of deltadata data structures corresponding to one of the vertices; and
wherein each of the plurality of deltadata data structures comprises an x-axis delta value, a y-axis delta value, and a z-axis delta value.

18. The optical disk, a magnetic disk storage device, or solid state storage device of claim 17, wherein to generate the first animation structure in the binary transition file, the computer-executable instructions further cause the computer to:
generate a slide identifier in the first animation structure, the slide identifier specifying one of the slides that is applied to the first three-dimensional mesh;
generate a set of flags in the first animation structure, the set of flags providing additional information regarding the first three-dimensional mesh;
generate an ambient lighting value in the first animation structure, the ambient lighting value specifying an amount of ambient lighting applied to the first three-dimensional mesh; and
wherein the set of flags comprises a first flag, a first bit value of the first flag specifying that the first three-dimensional mesh is rendered as a double-sided three-dimensional mesh, a second bit value of the first flag specifying that the first three-dimensional mesh is rendered as a single-sided three-dimensional mesh.

19. The optical disk, a magnetic disk storage device, or solid state storage device of claim 17, wherein to generate the header portion in the binary transition file, the computer-executable instructions further cause the computer to:
generate an animation count in the header portion, the animation count specifying a quantity of slides in the transition; and
generate an animations array in the header portion, the animations array comprising a plurality of animation data structures, each of the plurality of animation data structures specifying animation data enabling the presentation program application to render a slide corresponding to the animation data.

20. A computer system, comprising:
a processor;
a memory communicatively coupled to the processor; and a program module which executes in the processor from the memory and which, when executed by the processor, causes the computer system to:
  generate a plurality of animation structures in a binary transition file, the plurality of animation structures defining a sequence of three-dimensional meshes, the plurality of animation structures specifying vertices and indices forming the three-dimensional meshes;
  generate a header portion in the binary transition file, the header portion defining slides that are applied to the three-dimensional meshes to produce a transition between the slides, the binary transition file storing delta values of the vertices between frames in the transition; and
  modify a presentation program application with the binary transition file, the presentation program application adapted to provide the transition upon the modification.

* * * * *